United States Patent [19]

Satoh et al.

[11] 4,366,513

[45] Dec. 28, 1982

[54] TAPE RECORDER WITH NOISE BLANKING CIRCUIT

[75] Inventors: Ken Satoh; Shunichi Orita, both of Hachioji, Japan

[73] Assignee: Olympus Optical Company Limited, Tokyo, Japan

[21] Appl. No.: 41,315

[22] Filed: May 22, 1979

[30] Foreign Application Priority Data

May 23, 1978 [JP] Japan .......................... 53/69581[U]
May 23, 1978 [JP] Japan .......................... 53/69582[U]

[51] Int. Cl.³ ............................................. G11B 5/47
[52] U.S. Cl. ................................................... 360/66
[58] Field of Search ..................... 360/60, 61, 66, 68

[56] References Cited

U.S. PATENT DOCUMENTS

| | | | |
|---|---|---|---|
| 3,647,989 | 3/1972 | Mattas | 360/61 |
| 3,714,666 | 1/1973 | Guidi | 360/60 |
| 3,721,774 | 3/1973 | Yonemoto et al. | 360/61 |
| 3,902,191 | 8/1975 | Lynn | 360/61 |
| 3,937,902 | 2/1976 | Dorren | 360/61 |
| 3,952,330 | 4/1976 | Rimkus et al. | 360/61 |
| 3,959,817 | 5/1976 | Honjo et al. | 360/61 |
| 4,127,880 | 11/1978 | Emmert | 360/60 |

*Primary Examiner*—Vincent P. Canney
*Attorney, Agent, or Firm*—Toren, McGeady and Stanger

[57] ABSTRACT

The disclosed tape recorder serves for supplying a microphone output to a recording and reproducing head through an amplifier during recording by switching a recording and reproducing switch. A noise removing circuit at the output of said amplifier suppresses the output from the amplifier to the head a predetermined time during application of an electric power supply source of the amplifier.

5 Claims, 3 Drawing Figures

TAPE RECORDER WITH NOISE BLANKING CIRCUIT

BACKGROUND OF THE INVENTION

The present invention relates to a tape recorder which can remove a noise generated by applying an electric power supply source when recording.

A tape records often recorded noises due to various causes on a tape when recording. One of such causes is the charging noise generated during initial operation of an amplifier when the electric supply source is switched on.

Another of such causes, is that which occurs when a current flowing into an erasing head when an electric power supply source is switched on, is subjected to interruption of the power by chattering of a thrown switch or the like. The interruption of the current in this case is recorded as a noise. Even if a switch does not chatter, in case of direct current saturation erase, a high suddenly changed magnetic flux (inclusive of the case of a zero erase) previously recorded on the tape and is reproduced as a noise.

Many a tape recorder is used as a dictating machine, and such dictating machine is often subjected to repeated switching between recording and stopping or vice versa. Therefore, the above noise is recorded when the electric supply source is switched on for recording, and the regenerated sounds of these noises frequently generated at the time of reproduction prevent the recorded content from being properly reproduced.

SUMMARY OF THE INVENTION

An object of the present invention is to eliminate the above disadvantages of the conventional tape recorder.

Another object of the present invention is to provide a tape recorder which positively removes noises of an amplifier generated by switching on an electric power supply source when recording.

A further object of the present invention is to provide a tape recorder which can positively remove noises recorded on a tape by the erasing head when switching on an electric power supply source during recording.

According to the present invention a tape recorder for supplying a microphone output to a recording and reproducing head through an amplifier at the time of recording by switching a recording and reproducing switch comprises a noise removing circuit provided at the output side of said amplifier with the output from said amplifier to the head being removed for a predetermined time simultaneously with application of an electric power supply source to the amplifier. A tape recorder for supplying an erasing current from an electric power supply source to an erasing head by switching a recording and reproducing switch at the time of recording comprises a noise removing circuit at an input of the erasing head for successively raising the erasing current to a predetermined value upon application of the electric power supply source. The noise removing circuit comprises a capacitor simultaneously charged with the input of said electric power supply source and a switching element which is made conductive by a charging current of the capacitor.

DESCRIPTION OF THE PREFERRED EMBODIMENT

Figure 1:
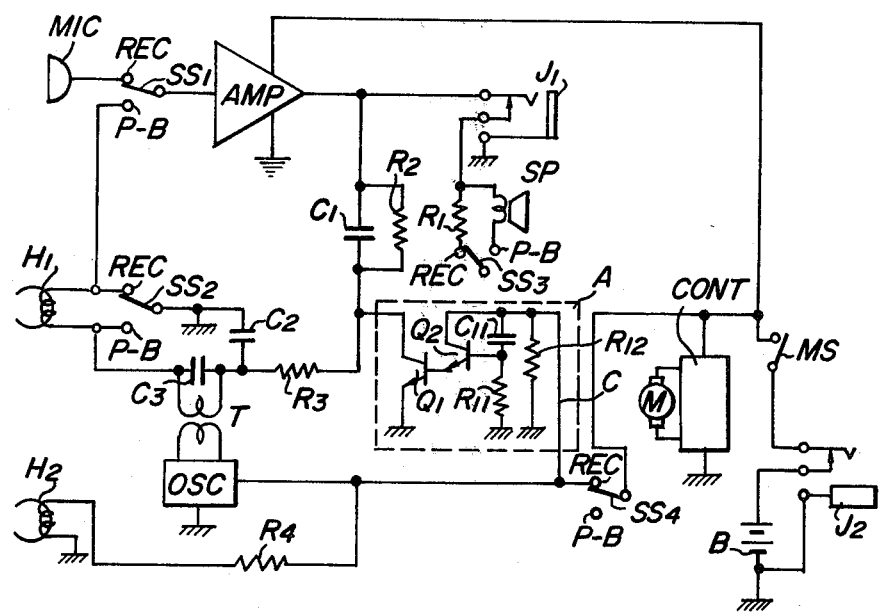
FIG. 1 is a circuit diagram showing one embodiment of a tape recorder according to the present invention.

In FIG. 1, the moving armatures of switches $SS_1$-$SS_4$ connect with contacts REC during recording and to contacts P·B while reproducing.

An amplifier AMP connects to a microphone MIC through the contact REC of the switch $SS_1$ and further connects to one end of a recording and reproducing head $H_1$ through the contact P·B. Further, an output terminal of the amplifier AMP is connected to the contact REC of the switch $SS_3$ through a earphone jack $J_1$ and a resistor $R_1$. The connecting point of the jack $J_1$ and the resistor $R_1$ is connected to the contact P·B of said switch $SS_3$ through a speaker SP, and a movable contact of the switch $SS_3$ is grounded. The output terminal of the amplifier AMP is further connected to the head $H_1$ through a parallel circuit composed of a resistor $R_2$ and a capacitor $C_1$ and the resistor $R_3$. The head $H_1$ is connected to the REC contact of the switch $SS_2$ at one end and to the P·B contact of the switch $SS_2$ at the other end, respectively.

A direct current electric power supply source B is connected to a movable contact of an electric source switch MS through the external electric source jack $J_2$. The main switch MS is closed at the time of recording or reproducing a tape recorder.

To a normally opened contact of the main switch MS is connected a motor control circuit CONT for driving and controlling a motor M and is further connected an electric supply source terminal of the amplifier AMP. Further, the normally opened contact of the main switch MS is connected to the movable contact of the switch $SS_4$.

The contact REC of the switch $SS_4$ is connected to an erasing head $H_2$ through the resistor $R_4$ and is further connected an oscillation circuit OSC. The oscillation circuit OSC provides an alternating current bias to the above-described head $H_1$, and its output terminal is inserted between the resistor $R_3$ and the head $H_1$ through a transformer T.

The REC contact of the switch $SS_4$ is connected a noise removing circuit A. The noise removing circuit A connects a control line C to the REC contact of the switch $SS_4$. Between the control line C and the ground is connected a series circuit composed of a capacitor $C_{11}$ and a resistor $R_{11}$, and the junction of the capacitor $C_{11}$ and the resistor $R_{11}$ is connected to a switching element, to a transistor $Q_2$ at its base. The transistor $Q_2$ has its collector connected to the control line C and its emitter to another switching element to a transistor $Q_1$ at its base. The transistor $Q_1$ has its collector connected to the junction of the parallel circuit composed of the resistor $R_2$ and the capacitor $C_1$ and the resistor $R_3$ and has its emitter grounded. The resistor $R_{12}$ shunts the series circuit composed of the capacitor $C_{11}$ and the resistor $R_{11}$. The resistor $R_{12}$ forms a discharge circuit for the capacitor $C_{11}$.

Capacitors $C_2$, $C_3$ are connected to the secondary of the transformer T.

When the movable contacts of the recording and reproducing switches $SS_1$-$SS_4$ are switched to the contacts REC and the main switch MS is simultaneously turned on, the motor control circuit CONT, the amplifier AMP, the erasing head $H_2$ and the oscillation circuit OSC are energized by the direct current electric power supply source B through the main switch MS. In this case, switching on the main switch MS charges the capacitor $C_{11}$ of the noise removing circuit A, the transistor $Q_2$ is turned on by this charging current, and the transistor $Q_1$ is then turned on. Then, the output immediately after energizing amplifier AMP, i.e., the charged noise, is grounded through the transistor $Q_1$. Thereby, the charged noise generated when the amplifier becomes the acting state is removed, and the noise is not recorded on the tape.

When the charging of the capacitor $C_{11}$ is completed, the transistors $Q_2$, $Q_1$ are successively turned off, and thereafter, the output of the amplifier AMP is applied to the head $H_1$ and recorded on the tape.

In this case, the acting time of the noise removing circuit A, i.e., the setting of the time during which the transistor $Q_1$ is on, is determined by the base-emitter characteristic of the capacitor $C_{11}$, the resistor $R_{11}$ and the transistors $Q_1$, $Q_2$. (In practice, it does not require a long time so that the setting is determined by the capacitor $C_{11}$ and the resistor $R_{11}$). Further, when the recording mode is ended and the main switch MS is opened, the capacitor $C_{11}$ quickly discharges the charging load through the resistor $R_{12}$ and prepares for the next recording state.

When the recording and reproducing switches $SS_1$-$SS_4$ are switched to the contact P·B and the main switch MS is simultaneously closed, the output of the head $H_1$ is applied to the speaker SP through the amplifier AMP, and the recorded content of the tape is reproduced.

In this case, the noise removing circuit A is cut off from the electric source B by the switch $SS_4$, and the above-described reproducing action is not affected.

Therefore, according to this construction, it becomes possible to remove the charged noise generated immediately after energizing of the amplifier by the action of the noise removing circuit together with the application of the electric source when recording, so that any noise recording on the tape can be prevented, thereby permitting excellent reproduction of the recorded content. Further, in a dictating machine, which frequently repeats switching of recording and reproduction, any noise often generated at the time of reproduction can effectively be removed.

Figure 2:
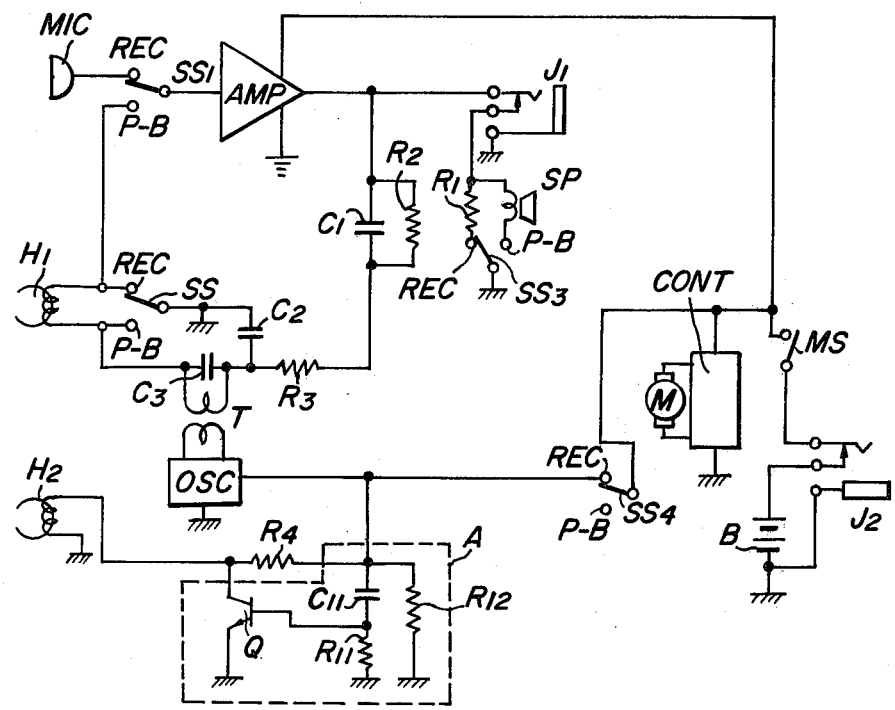
FIG. 2 is a circuit diagram showing another embodiment of a tape recorder according to the present invention.

Another embodiment of the tape recorder according to the present invention is shown in FIG. 2. Recording and reproducing switches $SS_1$–$SS_4$ can be switched to a contact REC at the time of recording and to a P·B contact at the time of reproduction, respectively.

The amplifier AMP has its input terminal connected to a microphone MIC through the contact REC of the switch $SS_1$ and also to one end of a recording and reproducing head $H_1$ through the contact P·B. The output terminal of the amplifier AMP is connected to the contact REC of the switch $SS_3$ through an earphone jack $J_1$ and a resistor $R_1$, the junction of the jack $J_1$ and the resistor $R_1$ is connected to the contact P·B of the switch $SS_3$ through a speaker SP, and a movable contact of the switch $SS_3$ is grounded. Further, the output terminal of the amplifier AMP is connected to the other end of the head $H_1$ through a parallel circuit of a resistor $R_2$ and a capacitor $C_1$ and a resistor $R_3$. This head $H_1$ is connected to the contact REC of the switch $SS_2$ at one end and to the contact P·B of the same switch $SS_2$ at the other end. The movable contact of the switch $SS_2$ is grounded.

On the other hand, a direct current power supply source B is connected to a movable contact of a main switch MS serving as an electric source switch through an external electric power supply source jack $J_2$. This main switch MS is on at the time of recording or reproducing with the tape recorder.

Further, a normally opened contact of the main switch MS is connected to a motor control circuit CONT for driving and controlling a motor M and further connected to an electric supply source terminal of the amplifier AMP. The normally opened contact of the main switch MS is connected to a movable contact of the switch $SS_4$.

The contact REC of the switch $SS_4$ is connected to the erasing head $H_2$ through a resistor $R_4$ and further connected to an oscillation circuit OSC. This oscillation circuit OSC provides an alternating current bias to the above-described head $H_1$ and its output terminal is inserted between the resistor $R_3$ and the head $H_1$ through a transformer T.

To the contact REC of said switch $SS_4$ is connected a noise erasing circuit A In the noise erasing circuit A the junction of the contact REC of said switch $SS_4$ and the contact of the resistor $R_4$ is connected to a capacitor $C_{11}$. A resistor $R_{11}$ connects the capacitor $C_{11}$ to ground, and the contact point of the capacitor $C_{11}$ and the resistor $R_{11}$ is connected to a switching element, such as a transistor Q at its base. The transistor Q has its collector connected to the junction of the resistor $R_4$ and the erasing head $H_2$ and grounds the emitter. Further, a resistor $R_{12}$ is connected across the series circuit composed of the capacitor $C_{11}$ and the resistor $R_{11}$. The resistor $R_{12}$ forms a discharge circuit of the capacitor $C_{11}$.

Capacitors $C_2$ and $C_3$ are connected to the transformer T.

The movable contacts of the recording and reproducing switches $SS_1$–$SS_4$ are switched to the contact REC and at the same time the main switch MS is switched on, the motor control circuit CONT, the amplifier AMP, the erasing head $H_2$ and the oscillation circuit OSC are energized through the main switch MS by the direct current electric power supply source B. In this case, a charging current flows through the capacitor $C_{11}$ of the noise erasing circuit A in response to switching on of the main switch MS and the transistor Q is turned on by this charging current. Then, almost all currents applied to the erasing head $H_2$ flow to ground through the transistor Q and thereafter, as a base bias of the transistor Q is reduced by the reduction of the charging current of the capacitor $C_{11}$, the erasing current to the erasing head $H_2$ is successively increased. Hence, even if the current flowing to the erasing head $H_2$ at the time of switching on the supply source generates an interruption of the power by chattering of the switch or the like, almost all currents flow to ground through the transistor Q, so that the interruption current in this case is prevented from being recording as a noise on the tape. Further, the erasing current to the erasing head $H_2$ is successively increased, so that the recording of any noise on the tape due to the sudden rise of the erasing current can be prevented.

When the charging of the capacitor $C_{11}$ is completed, the transistor Q is turned off, a predetermined erasing current applied to the erasing head $H_2$, and thereafter, the output of the microphone MIC is applied to the head $H_1$ through the amplifier AMP and recorded on the tape.

Here, the operation time of the noise erasing circuit A, i.e., the setting of the on time of the transistor Q, is determined by the base-emitter characteristic of the capacitor $C_{11}$, the resistor $R_{11}$ and the transistor Q. (In practice, it does not necessarily require a long time, so that it is effectively determined by the capacitor $C_{11}$ and the resistor $R_{11}$). Further, when the recording mode is stopped and the main switch MS is opened, the capacitor $C_{11}$ quickly discharges the charging load through the resistor $R_{12}$ for the next recording period.

Then, the recording and reproducing switches $SS_1$-$SS_4$ are switched to the contact P·B, and at the same time, the main switch MS is closed, the output of the head $H_1$ is applied to the speaker SP through the amplifier AMP and the recorded content of the tape can be reproduced.

In this case, since the noise erasing circuit A is cut off from the supply source B by the switch $SS_4$, it does not influence the above-described reproducing operation.

Thus, according to this construction, with the input of the supply source at the time of recording the tape recorder and the simultaneous action of the noise erasing circuit, the erasing current to the erasing head can successively be increased, so that the recording of the noise to the tape can be prevented. Thereby, good reproduction can be carried out. Further, in a dictating machine which frequently repeats recording and reproduction, any noise often generated at the time of reproduction can effectively be removed.

Figure 3:
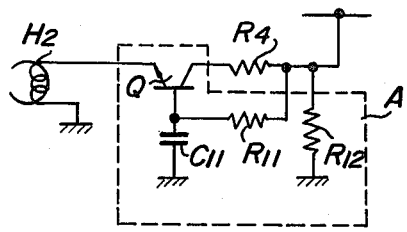
FIG. 3 is a circuit diagram showing essential part of a further embodiment of a tape recorder according to the present invention.

In addition, the present invention is not limited to the above embodiments but can be modified without departing from the essential feature of the present invention. For instance, as shown in FIG. 3, the noise erasing circuit A can be inserted in series between the resistor $R_4$ and the erasing head $H_2$.

As described above, the present invention can provide a tape recorder which can positively remove the noise recorded on a tape from the erasing head by switching on an electric power supply source at the time of recording.

Moreover, present invention can provide a tape recorder which can positively remove the noise generated by switching on the electric source when recording.

What is claimed is:

1. In a tape recorder which supplies an erasing current from an electric power supply source to an erasing head by switching a recording and reproducing switch at the time of recording, the improvement comprising a noise removing circuit at an input of said erasing head for momentarily suppressing and then increasing the erasing current to a predetermined value by switching on said electric power supply source.

2. A tape recorder as claimed in claim 1, wherein said noise removing circuit comprises a capacitor arranged to be simultaneously charged by the input of said electric power supply source and a switching element arranged to become conductive in response to charging current of the capacitor.

3. A device as in claim 1, wherein said recorder includes an erasing oscillator, wherein said noise removing current includes a transistor circuit connected directly to the output of the oscillator, said transistor circuit having a transistor with a control electrode and two other electrodes, an RC circuit forming a junction at the control electrode and a capacitor connected from the control electrode to one of the other electrodes.

4. A device as in claim 3, wherein said other electrode is the collector of said transistor, and the transistor circuit is connected across the output of the oscillator.

5. A device as in claim 3, wherein the other electrode is the emitter and said transistor is connected so that its emitter collector circuit is in series with the erasing head.

* * * * *